US009150171B2

(12) United States Patent
Kim et al.

(10) Patent No.: US 9,150,171 B2
(45) Date of Patent: Oct. 6, 2015

(54) VEHICLE SEAT

(71) Applicant: NHK SPRING CO., LTD., Yokohama-shi (JP)

(72) Inventors: Donghyoun Kim, Yokohama (JP); Hidemi Haga, Yokohama (JP)

(73) Assignee: NHK SPRING CO., LTD., Yokohama-Shi (JP)

( * ) Notice: Subject to any disclaimer, the term of this patent is extended or adjusted under 35 U.S.C. 154(b) by 116 days.

(21) Appl. No.: 13/856,309

(22) Filed: Apr. 3, 2013

(65) Prior Publication Data
US 2013/0264851 A1    Oct. 10, 2013

(30) Foreign Application Priority Data

Apr. 5, 2012   (JP) .................................. 2012-086582

(51) Int. Cl.
*B60N 2/48* (2006.01)
*B60R 16/03* (2006.01)
*B60N 2/46* (2006.01)

(52) U.S. Cl.
CPC .............. *B60R 16/03* (2013.01); *B60N 2/468* (2013.01); *B60N 2/4876* (2013.01); *B60N 2002/4897* (2013.01)

(58) Field of Classification Search
CPC ................... B60N 2002/4897; B60N 2/4876; B60R 16/03
USPC ...................................................... 297/217.3
See application file for complete search history.

(56) References Cited

U.S. PATENT DOCUMENTS

| 6,698,832 | B2 * | 3/2004 | Boudinot .................... 297/217.4 |
| 8,109,569 | B2 * | 2/2012 | Mitchell ..................... 297/217.3 |
| 8,780,282 | B2 * | 7/2014 | Vitito .............................. 348/837 |
| 2003/0111880 | A1 * | 6/2003 | Lambiaso .................. 297/217.3 |
| 2005/0200185 | A1 * | 9/2005 | Yokoyama et al. ............ 297/410 |
| 2008/0252798 | A1 * | 10/2008 | Vitito ............................ 348/837 |
| 2009/0315368 | A1 * | 12/2009 | Mitchell .................. 297/188.04 |
| 2010/0289302 | A1 * | 11/2010 | Cheng ..................... 297/180.12 |
| 2011/0109134 | A1 * | 5/2011 | Filipour et al. ............. 297/217.4 |
| 2012/0086247 | A1 * | 4/2012 | Liu ............................. 297/217.3 |
| 2012/0280542 | A1 * | 11/2012 | Wood ......................... 297/180.1 |
| 2014/0077539 | A1 * | 3/2014 | Brawner .................... 297/217.3 |
| 2014/0175847 | A1 * | 6/2014 | Schurg et al. ............ 297/188.07 |
| 2014/0217789 | A1 * | 8/2014 | Chang ........................ 297/217.4 |
| 2014/0265481 | A1 * | 9/2014 | Riedel et al. ............... 297/217.4 |
| 2014/0284972 | A1 * | 9/2014 | Riedel et al. ............. 297/188.04 |

FOREIGN PATENT DOCUMENTS

| JP | S63-36355 U | 3/1988 |
| JP | 2005-67563 A | 3/2005 |
| JP | 2006-273127 A | 10/2006 |
| JP | 2007-520388 A | 7/2007 |
| JP | 2012-183856 A | 9/2012 |

OTHER PUBLICATIONS

Japanese Office Action dated Mar. 10, 2015 in corresponding application No. 2012-086582.

* cited by examiner

*Primary Examiner* — David R Dunn
*Assistant Examiner* — Timothy J Brindley
(74) *Attorney, Agent, or Firm* — Knobbe Martens Olson & Bear LLP (57) ABSTRACT

A vehicle seat comprising a seat main body including a seat cushion that supports buttocks and thighs of an occupant and a seatback that supports the upper body of the occupant; and a USB connector provided at the seat main body.

5 Claims, 8 Drawing Sheets

VEHICLE SEAT

CROSS-REFERENCE TO RELATED APPLICATION

This application claims priority under 35 USC 119 from Japanese Patent Application No. 2012-086582 filed on Apr. 5, 2012, the disclosure of which is incorporated by reference herein.

BACKGROUND OF THE INVENTION

1. Technical Field

The present invention relates to a vehicle seat.

2. Related Art

Japanese Patent Application Laid-Open (JP-A) No. 2006-273127 discloses an accessory socket that can be used as a power socket, provided at a center console positioned between a driver's seat and a front passenger seat.

SUMMARY

However, in this configuration, it is necessary to connect a USB adaptor to the accessory socket when for example an occupant charges a USB device inside the vehicle.

In consideration of this issue, the present invention obtains a vehicle seat capable of increasing convenience when an occupant uses a USB device inside a vehicle.

A vehicle seat of a first aspect of the present invention includes: a seat main body including a seat cushion that supports buttocks and thighs of an occupant and a seatback that supports an upper body of the occupant; and a USB connector provided at the seat main body.

In the first aspect, the USB connector is provided at the seat main body. In other words, the USB connector is provided in the vicinity of an occupant seated in the vehicle seat. The occupant seated in the vehicle seat is accordingly able to use a USB device inside the vehicle by connecting a USB device to the USB connector provided at the seat main body.

A vehicle seat of a second aspect of the present invention is the vehicle seat of the first aspect wherein: the seat main body is provided with a support portion at which a headrest is supported; and the USB connector is integrally configured with a grommet that is attached to the support portion.

In the second aspect, the USB connector is integrally configured to the grommet that is attached to the support portion of the headrest. There is accordingly no need to separately provide a fixing such as a bracket in order to fix the USB connector to the vehicle seat.

A vehicle seat of a third aspect of the present invention is the vehicle seat of either the first aspect or the second aspect wherein the USB connector is inclined with respect to a seat up-down direction.

In the third aspect, the USB connector is inclined with respect to the seat up-down direction. Dust and moisture, for example, is thereby suppressed from building up or remaining in the USB connector.

The vehicle seat of the first aspect exhibits the excellent advantageous effect of enabling convenience to be increased when an occupant uses a USB device inside the vehicle.

The vehicle seat of the second aspect exhibits the excellent advantageous effect of obviating the need for an additional bracket for fixing the USB connector.

The vehicle seat of the third aspect exhibits the excellent advantageous effect of enabling dust resistance and moisture resistance of the USB connector to be raised.

BRIEF DESCRIPTION OF THE DRAWINGS

Exemplary embodiments of the present invention will be described in detail based on the following figures, wherein.

DETAILED DESCRIPTION OF THE INVENTION

Figure 1:
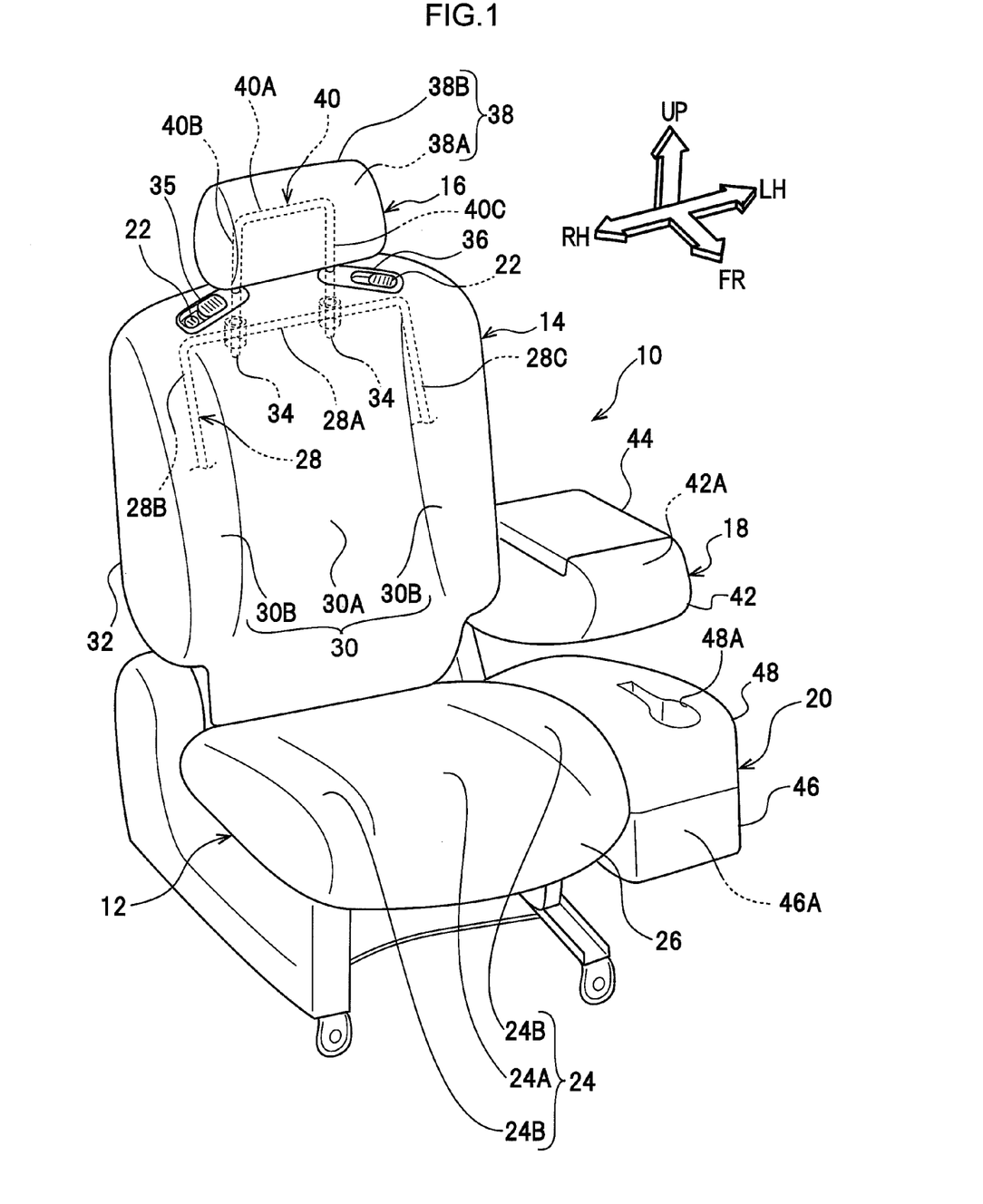
FIG. 1 is a perspective view illustrating a vehicle seat viewed diagonally from the front side.
Figure 2A:
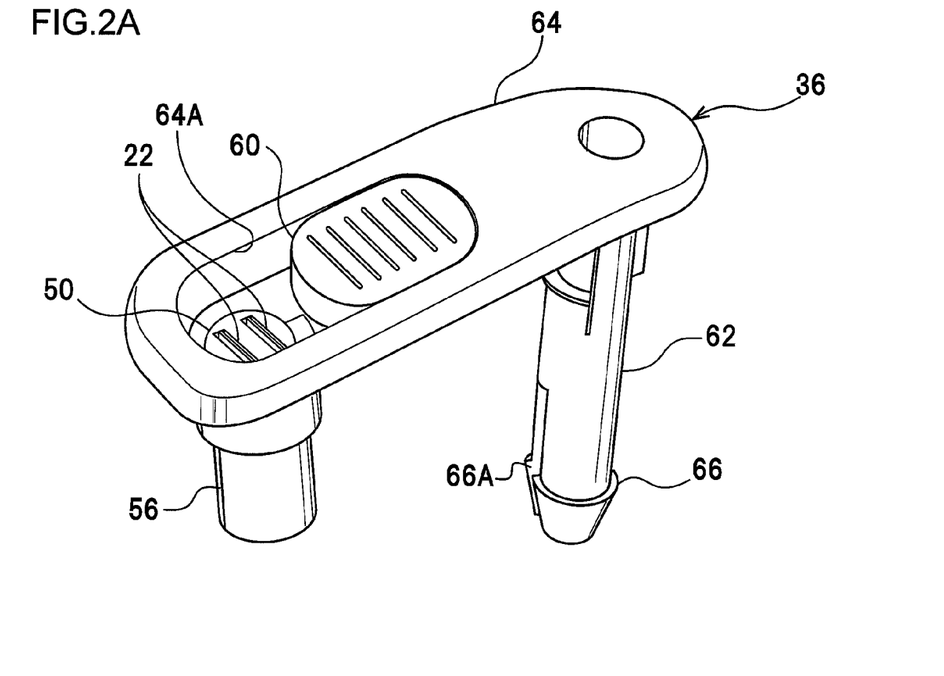
FIG. 2A is a perspective view illustrating grommet integrally configured with USB connectors.
Figure 2B:
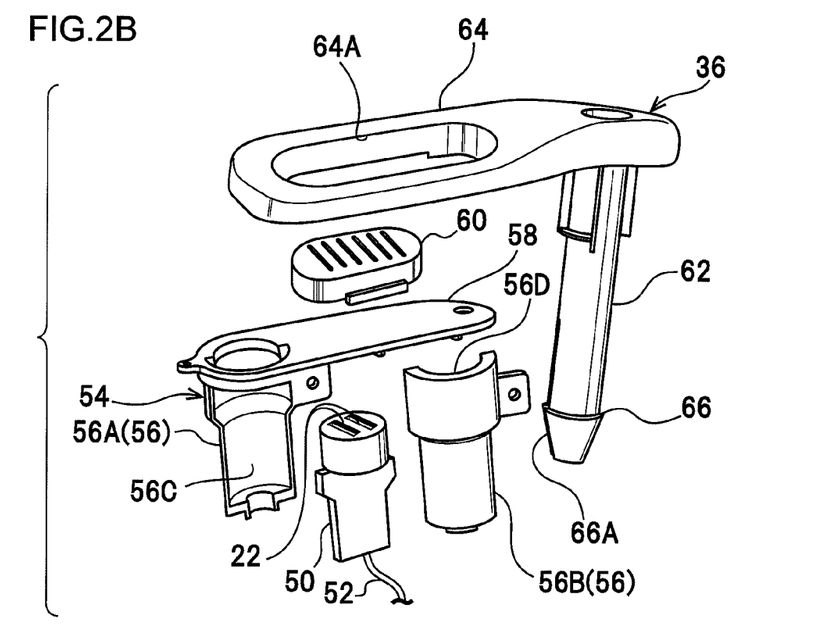
FIG. 2B is an exploded perspective view of the grommet illustrated in FIG. 2A.
Figure 3A:
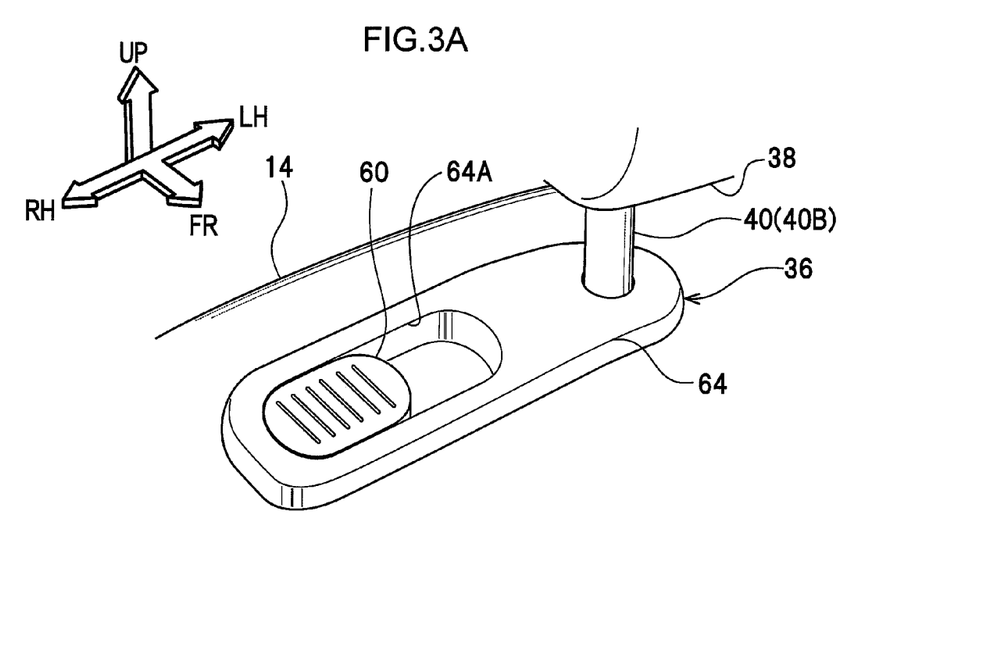
FIG. 3A is an enlarged perspective view illustrating USB connectors in a state closed off by a shutter.
Figure 3B:
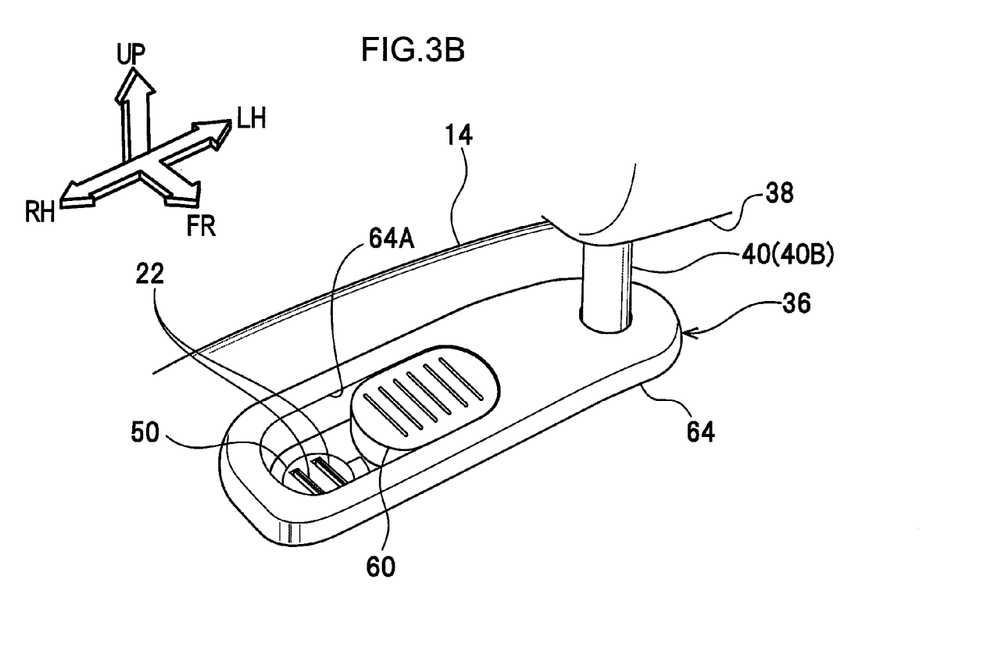
FIG. 3B is an enlarged perspective view illustrating the USB connectors in a state not closed off by the shutter.

Explanation follows regarding a vehicle seat according to an exemplary embodiment of the present invention with reference to FIG. 1 to FIG. 3. Note that in the following explanation, the front, back, left, right, up and down directions used in the explanation respectively indicate the front, back, left, right, up and down directions from the viewpoint of an occupant seated in a vehicle seat.

In each of the drawings, the arrow FR indicates the front direction, the arrow UP indicates the upwards direction, the arrow RH indicates the right hand direction and the arrow LH indicates the left hand direction, as appropriate. Moreover, the arrow FR direction represents the front direction of both the vehicle and the seat, the arrow UP direction represents the upwards direction of both the vehicle and the seat, and the arrow RH and the arrow LH represent both the vehicle width and the seat width directions.

As shown in FIG. 1, a vehicle seat 10 according to the present exemplary embodiment is a driver's seat disposed at the front right side of a vehicle cabin. More specifically, the vehicle seat 10 is equipped with a seat cushion 12 that supports the buttocks and thighs of an occupant, a seatback 14 that supports the upper body of the occupant, and a headrest 16 that supports the head of the occupant. The vehicle seat 10 is also equipped with an armrest 18 and a console box 20. The seat cushion 12, the seatback 14, the headrest 16, the armrest 18 and the console box 20 configure a seat main body. The vehicle seat 10 is further provided with USB connectors 22 for connecting USB devices. Explanation is first given regarding the seat cushion 12, followed by explanation regarding the seatback 14, the headrest 16, the armrest 18 and the console box 20, and lastly, explanation is given regarding the USB connectors 22 that are relevant portions of the present invention.

Seat Cushion 12

The seat cushion 12 is provided with a seat cushion frame, not shown in the drawings, that forms a framework of the seat cushion 12, and a seat cushion pad 24 attached so as to cover the seat cushion frame from the seat upper side.

The seat cushion frame is equipped with a pair of side frames. Lower end portions of a seatback frame 28, described later, are connected to rear end portions of the side frames so as to enable reclining.

The seat cushion pad 24 is formed from urethane foam, and configures a cushion layer of the seat cushion 12. The seat cushion pad 24 is provided with a pad main body portion 24A disposed at a seat width direction central portion, and side support portions 24B disposed on both sides in a seat width direction of the pad main body portion 24A. The seat cushion pad 24 is covered by a covering material 26 formed using for example fabric or leather.

Seatback 14

The seatback 14 is provided with the seatback frame 28 that forms a framework of the seatback 14, and a seatback pad 30 attached so as to cover the seatback frame 28 from the seat front side.

The seatback frame 28 is for example formed by bending hollow steel piping. More specifically, the seatback frame 28 is provided with a first framework portion 28A extending in the seat width direction, and a second framework portion 28B and a third framework portion 28C that respectively bend around and extend towards a seat lower side at seat width direction left side and right side end portions of the first framework portion 28A. Lower end portions of the second framework portion 28B and the third framework portion 28C configure connection portions that are connected to a seat cushion frame, not shown in the drawings. Moreover, plural side wires, not shown in the drawings, span between the second framework portion 28B and the third framework portion 28C. Configuration is made such that load imparted when an occupant rests against the seatback 14 is transmitted to the seatback frame 28 through the side wires. Support portions 34 that support the headrest 16, described later, are respectively provided at right side and left side in the seat width direction of the first framework portion 28A. The support portions 34 are cylindrically shaped, with grommets 36, described later, attached to the support portions 34.

The seatback pad 30 is formed from urethane foam, and configures a cushion layer of the seatback 14. More specifically, the seatback pad 30 is provided with a pad main body portion 30A disposed at a central portion in the seat width direction of the seatback 14, and side support portions 30B disposed on both sides in the seat width direction of the pad main body portion 30A. Similarly to the seat cushion pad 24, the seatback pad 30 is covered with a covering material 32 that is formed from for example fabric or leather.

Upper portions of the grommets 36 project out from an upper end portion of the seatback 14 in an attached state of the seatback pad 30 to the seatback frame 28.

Headrest 16

The headrest 16 is provided with a headrest main body 38 and a headrest stay 40.

The headrest main body 38 extends with its length direction along the seat width direction, and is configured in a barrel shape that is flattened in a seat front-rear direction. More specifically, in the headrest main body 38, a cushion member 38A formed from a urethane foam is covered by a covering material 38B formed for example from fabric or leather. A fixing groove, not shown in the drawings, is formed in the cushion member 38A for fixing the cushion member 38A to an upper end side of the headrest stay 40.

The headrest stay 40 is for example formed by bending stainless steel piping into a U-shape that is open towards a seat lower side. More specifically, the headrest stay 40 is provided with a base portion 40A extending in the seat width direction. The headrest stay 40 is further provided with a first extension portion 40B and a second extension portion 40C that respectively bend around and extend towards the seat lower side at both left and right direction end portions of the base portion 40A. The first extension portion 40B and the second extension portion 40C are inserted into openings in the grommets 36, described later, and inserted into openings in the support portions 34 provided at the seatback frame 28. The headrest 16 is thus supported at the support portions 34 of the seatback frame 28.

Armrest 18

The armrest 18 is configured including an armrest main body 42 formed substantially in a box shape, and an opening-and-closing lid 44 formed in a substantially rectangular flat plate shape. More specifically, the armrest main body 42 is provided with a recessed portion 42A formed so as to be open towards a seat upper side. Small items such as a USB device can be stored inside the recessed portion 42A. A base end side of the armrest main body 42 described above is attached so as to be capable of tilting at the left side of the seatback 14. The opening-and-closing lid 44 is formed in a substantially rectangular flat plate shape corresponding to a shape of the opening of the recessed portion 42A. The opening-and-closing lid 44 is attached to an opening edge portion of the recessed portion 42A with for example a hinge.

Console Box 20

Similarly to the armrest 18, the console box 20 is configured including a console box main body 46 formed substantially in a box shape, and an opening-and-closing lid 48 that opens and closes an opening of a recessed portion 46A formed to the console box main body 46. More specifically, the console box main body 46 is attached at the left side of the seat cushion 12, and is provided with the recessed portion 46A that is formed so as to open towards the seat upper side. Similarly to the recessed portion 42A formed to the armrest main body 42, small items such as a USB device can be stored in the recessed portion 46A. The opening-and-closing lid 48 is formed in a substantially rectangular flat plate shape corresponding to a shape of the opening of the recessed portion 46A. A drink holder 48A for holding a cup of water, for example, is further provided at the opening-and-closing lid 48. The thus described opening-and-closing lid 48 is attached to an opening edge portion of the recessed portion 46A with for example a hinge.

USB Connector 22

As shown in FIG. 2A, the USB connectors 22 are integrally configured to the grommet 36 attached to the support portions 34 (see FIG. 1) of the seatback frame 28.

More specifically, as shown in FIG. 2B, in the present exemplary embodiment, two USB connectors 22 are disposed side-by-side, fixed to one end portion of a connector case 50 that is formed from an insulating material such as a resin material. A wire 52 connected to the USB connectors 22 is configured so as to lead out from the other end portion of the connector case 50. The wire 52 leading out from the other end portion of the connector case 50 is connected for example to a power source adapted to a standard voltage or a navigation system 68 (see FIG. 4A). Note that USB is an abbreviated term for a Universal Serial Bus that is a serial bus standard used to connect peripheral devices to a computer. In the present exemplary embodiment, A-terminal female connectors are employed for the USB connectors 22, however it is also possible to employ for example mini A-terminal or micro A-terminal female connectors. The shape of the USB connectors can accordingly be set appropriately in consideration of the connector shape(s) of USB devices used inside the vehicle.

The connector case 50 to which the USB connectors 22 are fixed is attached to a support member 54. The support member 54 is provided with cylindrical shaped connector case housing portion 56 that houses the connector case 50, and shutter support portion 58 that extends towards the radial direction outside of the connector case housing portion 56. More specifically, the connector case housing portion 56 has a structure divided into a main body portion 56A and a cover portion 56B, and the main body portion 56A and the cover portion 56B are respectively provided with recessed portions 56C, 56D formed so as to follow a shape of the connector case 50. The connector case 50 is housed (fitted) inside the recessed portions 56C, 56D, with the connector case 50 held tightly with the main body portion 56A and the cover portion 56B of the connector case housing portion 56.

The shutter support portion 58 is formed in a plate shape with its plate thickness direction along an axial direction of the connector case housing portion 56, and with its length direction extending along the radial direction of the connector case housing portion 56. As a result, it is possible to slide a shutter 60 over the shutter support portion 58.

The grommet 36 is provided with a cylindrical shaped insertion portion 62 that is inserted into the support portion 34 provided at the seatback frame 28. The grommet 36 is further provided with an attachment portion 64 extending from one end portion of the insertion portion 62 towards a radial direction outside of the insertion portion 62, and a stopper portion 66 formed at the other end portion of the insertion portion 62. More specifically, the attachment portion 64 is formed in a plate shape with the plate thickness direction in an axial direction of the insertion portion 62 and extending substantially parallel to the shutter support portion 58. The attachment portion 64 is moreover provided with an elongated hole 64A formed along an attachment portion 64 length direction. Slide direction of the shutter 60 is limited by this elongated hole 64A (the shutter 60 is able to slide along the elongated hole 64A). The shutter support portion 58 of the support member 54 is attached to the attachment portion 64 of the grommet 36 described above. As a result, the USB connectors 22 are accessible through the elongated hole 64A formed in the attachment portion 64 of the grommet 36. Moreover, as shown in FIG. 3A and FIG. 3B, by sliding the shutter 60, the USB connector 22 is covered with the shutter 60. Namely, the USB connector 22 is protected by the shutter 60.

As shown in FIG. 2B, the stopper portion 66 is configured in a truncated conical shape that narrows towards the other end portion side of the insertion portion 62. Further, an upper end portion of the stopper portion 66 is formed such that an outer diameter of the upper end portion is equal to or larger than an inner diameter of the opening of the support portion 34. The stopper portion 66 is provided with a slit 66A configured so as to allow the stopper portion 66 to undergo resilient deformation such that the outer diameter of the upper end portion of the stopper portion 66 becomes equal to or smaller than the inner diameter of the opening of the support portion 34. As a result, during insertion of the insertion portion 62 of the grommet 36 into the opening of the support portion 34, the stopper portion 66 undergoes resilient deformation such that the outer diameter of the upper end portion of the stopper portion 66 becomes equal to or smaller than the inner diameter of the opening of the support portion 34. The stopper portion 66 then undergoes resilient recovery once insertion to the support portion 34 has been completed, such that the insertion portion 62 of the grommet 36 is prevented from being pulled out from the support portion 34.

As shown in FIG. 1, the grommet 36 described above is attached to the support portion 34 provided at the seat width direction right side of the first framework portion 28A of the seatback frame 28. In this state, the USB connectors 22 integrally configured to the grommet 36 are disposed to the right side of the support portion 34. Another grommet 36 is further attached to the support portion 34 provided at the seat width direction left side of the first framework portion 28A of the seatback frame 28. In this state, the USB connectors 22 are disposed to the left side of the support portion 34.

Operation and Advantageous Effects of the Present Exemplary Embodiment

Explanation follows regarding operation and advantageous effects of the present exemplary embodiment.

Figure 4A:
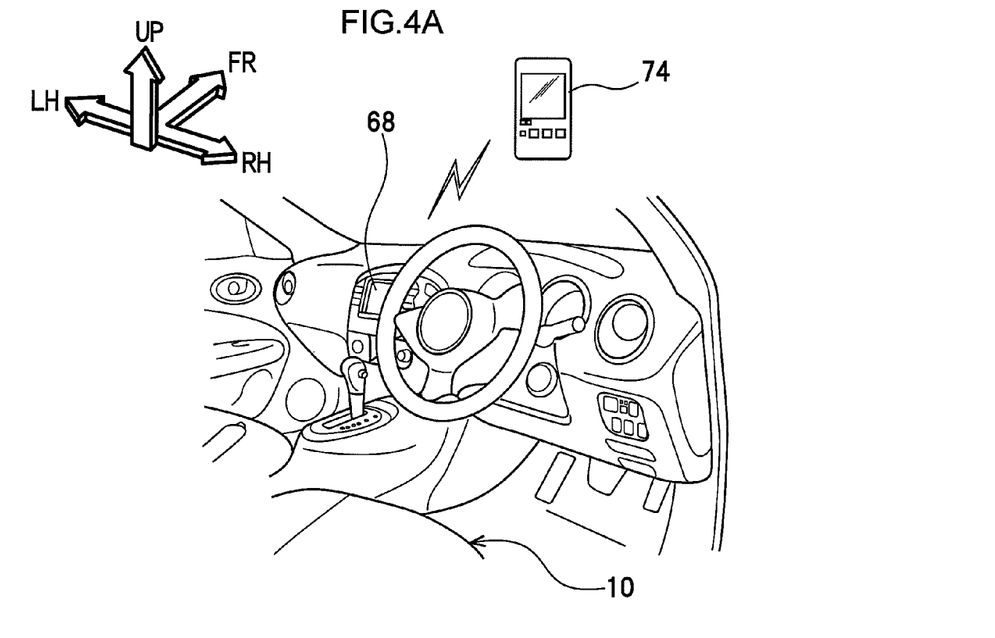
FIG. 4A is a perspective view illustrating a cabin provided with a navigation system as viewed from the driver's seat side.
Figure 4B:
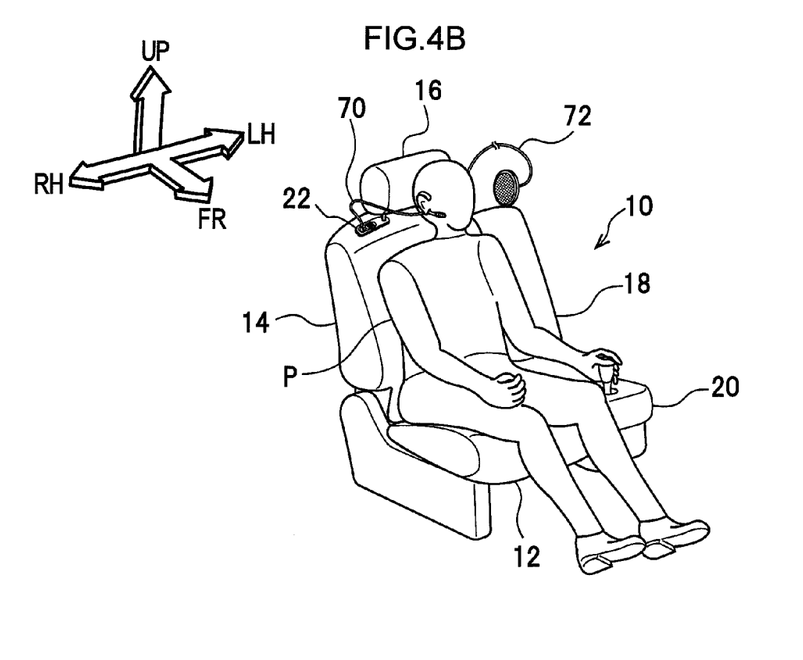
FIG. 4B is a perspective view illustrating a connected state of a speaker and a microphone to USB connectors provided at a seat main body.

As shown in FIG. 4B, in the present exemplary embodiment, the USB connectors 22 are provided at an upper end portion of the seatback 14 configuring the seat main body. In other words, the USB connectors 22 are provided in the vicinity of an occupant P seated in the vehicle seat 10. The occupant P seated in the vehicle seat 10 is accordingly able to use a USB device inside the vehicle by connecting the USB device to the USB connectors 22 provided at the upper end portion of the seatback 14.

Moreover, in the present exemplary embodiment, a microphone 70 and speaker 72 serving as USB devices are connected to the USB connectors 22. Namely, the microphone 70 and the speaker 72 are connected to the navigation system 68 through the USB connectors 22 and the wires 52 (see FIG. 2B). As shown in FIG. 4A, the navigation system 68 is configured so as to be capable of communicating with a mobile telephone 74. As a result, the occupant P is able to use the mobile telephone 74 (speak on the telephone) using the microphone 70 and the speaker 72 connected to the USB connectors 22 without touching the mobile telephone 74.

As described above, in the present exemplary embodiment, the convenience of the occupant P when using USB devices inside the vehicle can be increased.

Moreover, in the present exemplary embodiment, the USB connectors 22 are integrally configured to the grommet 36. There is accordingly no need to provide additional fixings such as brackets for fixing the USB connectors 22. As a result, in the present exemplary embodiment, increases in weight and cost of the vehicle seat 10 can be suppressed.

Figure 5A:
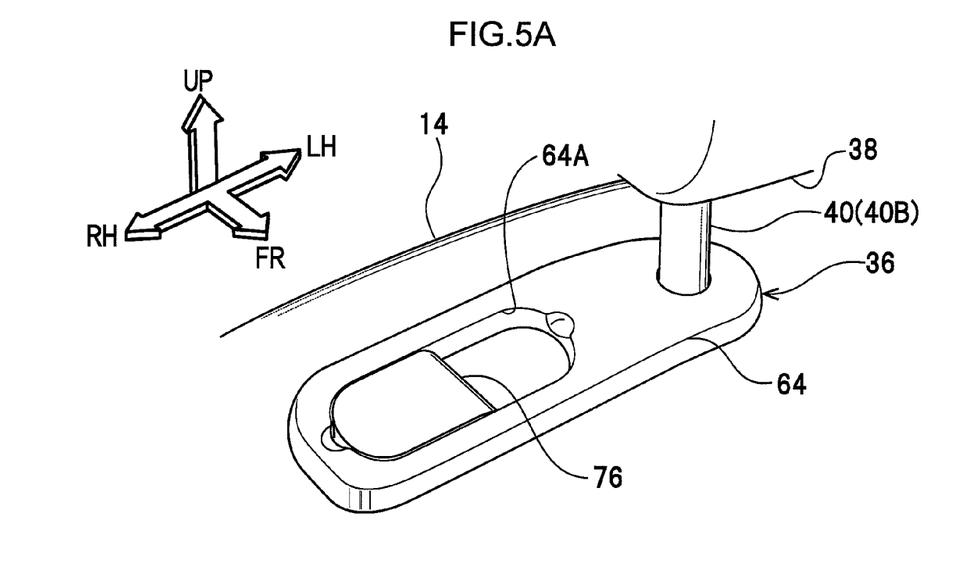
FIG. 5A is an enlarged perspective view illustrating USB connectors in a state closed off by an opening-and-closing lid.
Figure 5B:
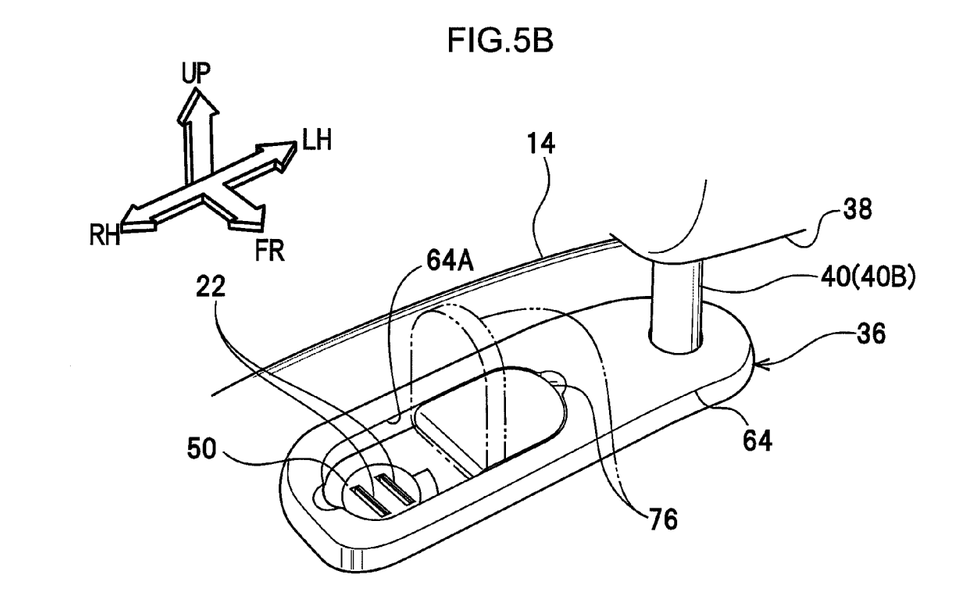
FIG. 5B is an enlarged perspective view illustrating USB connectors in a state not closed off by the opening-and-closing lid.

In the present exemplary embodiment, it is possible to cover the USB connector 22 with the shutter 60. Dust and moisture, for example, can accordingly be suppressed from penetrating inside the USB connector 22 when the USB connector 22 is not in use. Configuration may also be made using other mechanisms to protect the USB connector 22. For example, as shown in FIG. 5A and FIG. 5B, the USB connector 22 may be protected by an opening-and-closing lid 76. Such an opening-and-closing lid 76 is coupled capable of tilting so as to flip at about a length direction intermediate location of the elongated hole 64A formed in the attachment portion 64 of the grommet 36. The opening-and-closing lid 76 is configured so as to cover the USB connector 22 when flipped in one direction, and so as not to cover the USB connector 22 when flipped in the direction opposite to the one direction (so as to enable access to the USB connector 22).

Figure 6A:
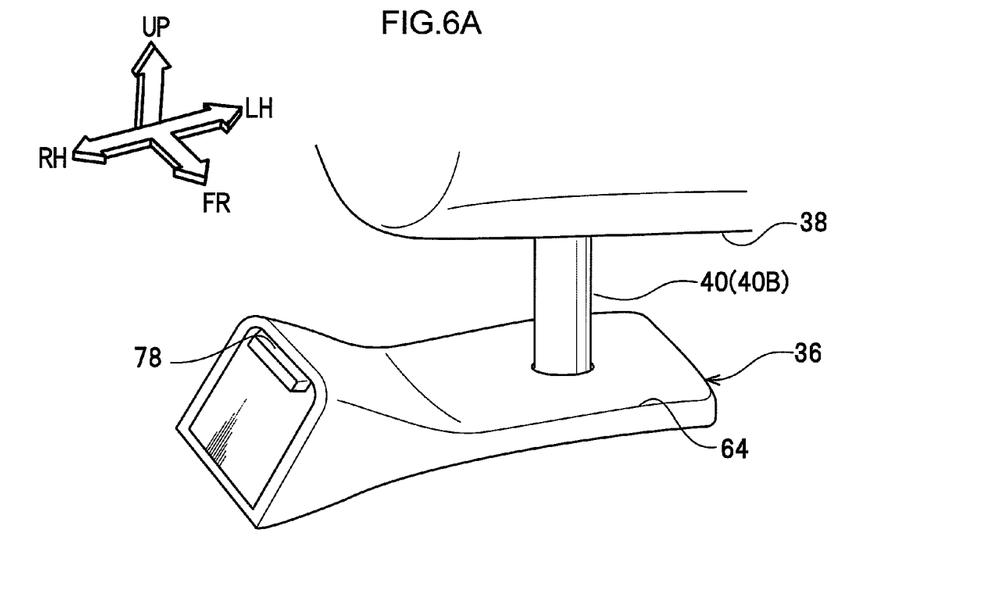
FIG. 6A is an enlarged perspective view illustrating USB connectors in a state closed off by a shutter.
Figure 6B:
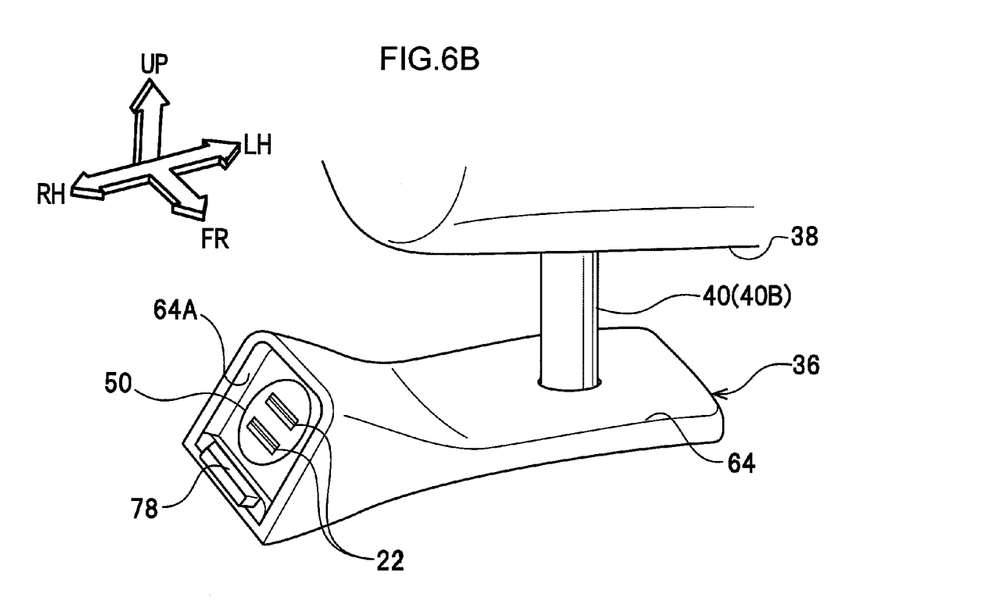
FIG. 6B is an enlarged perspective view illustrating USB connectors in a state not closed off by the shutter.

Moreover, as shown in FIG. 6A and FIG. 6B, a shutter 78 may be provided to cover the USB connector 22, with the USB connector 22 disposed inclined with respect to the seat up-down direction, in order to suppress for example dust and moisture from building up or remaining inside the USB connector 22. By inclining the USB connector 22 in such a way, dust and moisture, for example, can be suppressed from building up or remaining inside the USB connector 22. Note that portions such as the grommets illustrated in FIG. 6A and FIG. 6B have the same or similar functions to portions in the above exemplary embodiment and are allocated the same reference numerals.

Note that in the present exemplary embodiment, explanation has been given using the example of the microphone 70 and the speaker 72 as USB devices connected to the USB connectors 22, however the present invention is not limited thereto. For example, it is also possible to charge the mobile telephone 74 by connecting the mobile telephone 74 through a USB cable, not shown in the drawings. Various USB devices can be connected to the USB connectors 22 in this manner.

Figure 7A:
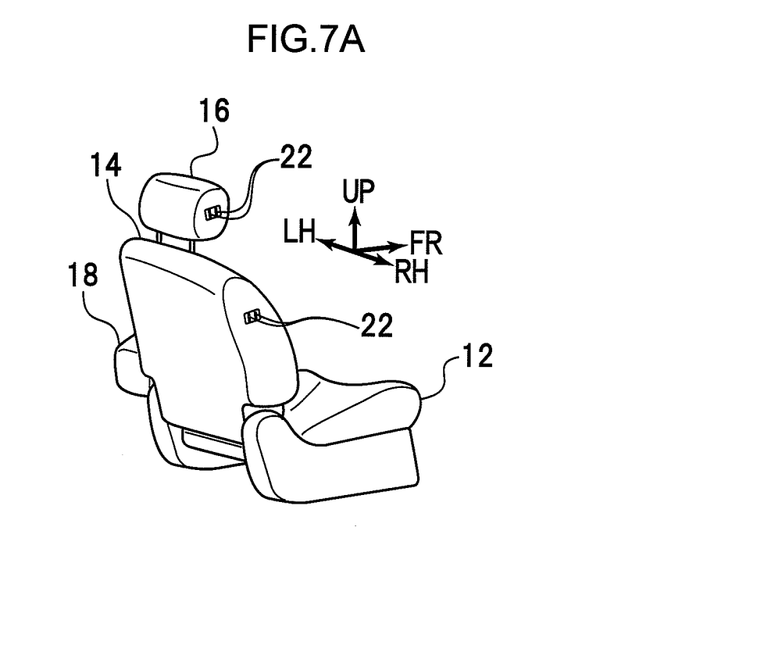
FIG. 7A to FIG. 7D are perspective views of vehicle seats illustrating variations in the placement of USB connectors.
Figure 7B:
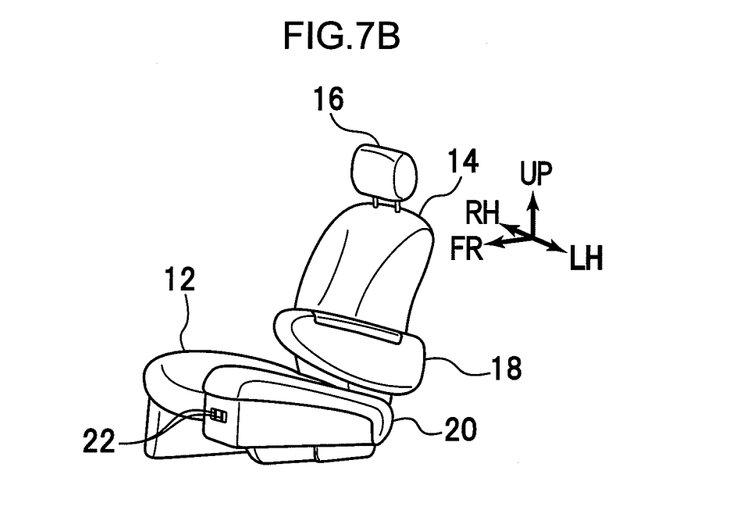
Figure 7C:
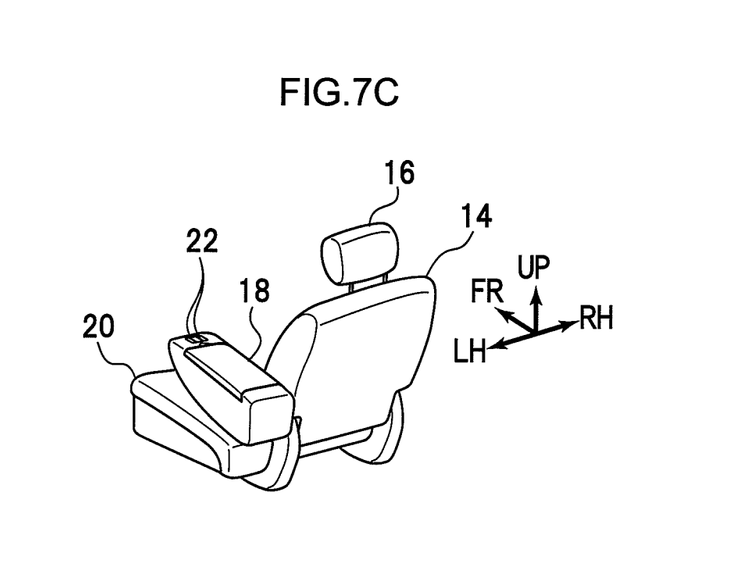
Figure 7D:
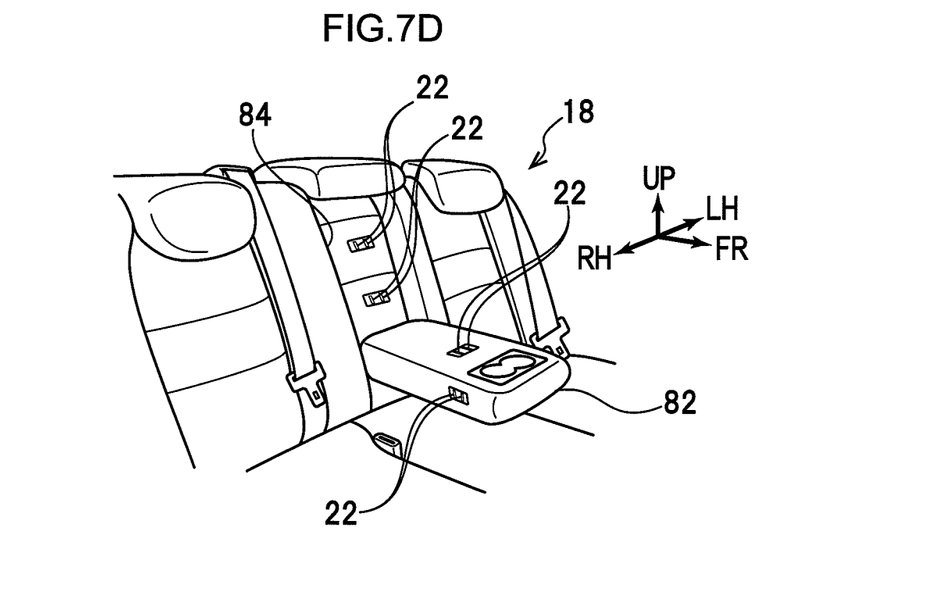

Moreover, in the present exemplary embodiment, explanation has been given of an example in which the USB connectors 22 are provided at the upper end portion of the seatback 14, however the present invention is not limited thereto. For example, as shown in FIG. 7A, the USB connectors 22 may be provided at side portions of the headrest 16 and/or the seatback 14. As shown in FIGS. 7B and 7C, the USB connectors 22 may also be provided at a front end portion of the console box 20 or to a front end portion of the armrest 18. As shown in FIG. 7D, the USB connectors 22 may be also provided at an armrest 82 of a rear seat 80, and/or to a housing portion 84 of the armrest 82.

Explanation has been given above regarding one exemplary embodiment of the present invention, however the present invention is not limited by the above, and obviously various modifications other than those described above may be implemented within a range not departing from the spirit of the present invention.

What is claimed is:

1. A vehicle seat comprising:
 a seat main body including a seat cushion that supports buttocks and thighs of an occupant and a seatback that supports the upper body of the occupant; and
 a USB connector provided at the seat main body,
 wherein the seat main body is provided with a support portion at which a headrest is supported;
 the USB connector is integrally configured with a grommet that is attached to the support portion;
 the USB connector is embedded in the seat main body; and
 the USB connector is provided at an outer side in a seat width direction from a stay of the headrest.

2. The vehicle seat of claim 1, wherein the USB connector is inclined with respect to a seat up-down direction.

3. The vehicle seat of claim 1, wherein the USB connector is provided at an upper end portion of the seatback.

4. The vehicle seat of claim 1, wherein the grommet comprises a connector housing portion for housing the USB connector.

5. The vehicle seat of claim 4, wherein the grommet further comprises a shutter and a shutter support portion that is extended in a radial direction outside of the connector housing portion, and the shutter can cover the connector housing portion.

\* \* \* \* \*